United States Patent Office 3,647,701
Patented Mar. 7, 1972

3,647,701
PROCESS FOR PREPARING A MIXTURE OF 4-METHYL-Δ-TETRAHYDROPHTHALIC ANHYDRIDES AS A CURING AGENT
Robert E. Robinson, Columbia, S.C., and Ronald L. De Hoff, Maplewood, N.J., assignors to R. T. Vanderbilt Company, Inc., New York, N.Y.
No Drawing. Filed Jan. 6, 1970, Ser. No. 1,049
Int. Cl. C07d 5/38; C08f 45/72
U.S. Cl. 252—182
8 Claims

ABSTRACT OF THE DISCLOSURE

The specification relates to a process for preparing liquid isomermized anhydride curing agent by reacting isoprene, butadiene, maleic anhydride or the like to provide an intermediate product which is subsequently rearranged in the presence of an organic sulfonic acid. The specification also relates to the curing agent prepared therefrom and its use in epoxy resins.

---

It is known that 4-methyl-Δ$^4$-tetrahydrophthalic anhydride can be isomerized by employing various catalysts (U.S. Pat. Nos. 2,959,597, 2,959,599, 3,470,132 and 3,470,214). However, these processes have certain disadvantages. For instance, with certain catalysts it is necessary to distill the final (reaction) mixture to obtain a useful product and with others, it is necessary to remove this catalyst by distillation to obtain a useful product. Furthermore, anhydride-containing products prepared by these processes have certain disadvantages, such as crystallization at room temperature with subsequent necessity of remelting at temperatures as high as 150° F. Some prior art products corrode the containers due to residual unneutralized acids. Any large excess of maleic anhydride produces lachrymation and is unpleasant to work with. Moreover, if any epoxy resin is cured with the anhydride-containing products prepared by the aforementioned prior art processes, the cured resin will tend to have a lower cross-link density and lower heat distortion temperature due to chain termination by unneutralized acids.

It has now been discovered that these disadvantages can be overcome by the process of this invention. Thus in accordance with one embodiment of this invention, an intermediate product containing 4-methyl-Δ$^4$-tetrahydrophthalic anhydride is formed by reacting isoprene, butadiene and maleic anhydride or the like. This intermediate product is subsequently rearranged with an organic sulfonic acid which is subsequently inactivated by reaction with an epoxide and, if necessary, any excess of maleic anhydride is scavenged (removed) by reaction with a diene to provide a liquid isomerized anhydride curing agent for epoxy resins containing a mixture of isomerized tetrahydrophthalic anhydrides.

The liquid isomerized anhydride epoxy curing agent of the invention possesses the following advantages: light color, low viscosity and stability toward crystallization for prolonged periods of time. It possesses unusual freeze-thaw properties since if frozen at 0° C., it remelts readily when returned to room temperature.

Moreover, the aforementioned product of the invention is 100% active. Its preparation requires no expensive decolorizing, filtering or distillation steps. It contains no unreacted alkenes which result in poor quality cured resins. It contains, if necessary, substantially no free maleic anhydride which is not only lachrymatory and unpleasant to work with, but causes corrosion. The anhydride curing agent of the invention can be stored in unlined steel drums without corroding them and without contaminating the anhydride with iron. The isomerized anhydride, therefore, remains free from discoloration and the resins cured therewith possess high electrical properties. Furthermore, the anhydride curing agent of the invention has very low toxicity and only mild skin irritating potential.

A first step in the process of the invention is to prepare an intermediate product which is predominantly 4-methyl-Δ$^4$-tetrahydrophthalic anhydride and which is subsequently rearranged and any excess maleic anhydride deactivated to provide a curing agent for epoxy resins. In this first step, substantially stoichiometric amounts of certain (aliphatic or cycloaliphatic) conjugated dienes and maleic anhydride are used, generally with a small excess of maleic anhydride. This invention uses a mixture of the aforementioned conjugated dienes which are capable of reacting with maleic anhydride to undergo a Diels-Alder ring closure. The following additional aliphatic and cycloaliphatic conjugated dienes, among others, are suitable: piperylene, hexadiene, cyclopentadiene, 4 - methyl-cyclopentadiene and myrcene and their $C_1$–$C_3$ alkyl-substituted homologs. Although it is not necessary for the success of this invention, the isoprene and butadiene may be introduced in the same stream containing about 75 to 95%, e.g., 85%, isoprene and about 25% to 5%, e.g., 15%, butadiene.

The third component for providing the aforementioned intermediate product is maleic anhydride. As defined herein maleic anhydride includes its lower alkyl-substituted derivatives, such as methyl-, ethyl-, or cyclohexyl-maleic anhydride. Although the maleic anhydride can be used in stoichiometric amounts, it is preferred to use up to about 5% excess, e.g., about 0.1% to 3% excess, to prevent discoloration of the final product.

It is also advantageous to have phthalic anhydride as a fourth compound in the preparation of the intermediate product. However, the phthalic anhydride can also be added in a subsequent step in the process. As defined herein phthalic anhydride includes other similar compounds, such as the following compounds, among others: methyl - endomethylenetetrahydrophthalic anhydride, allylsuccinic anhydride, dodecenylsuccinic anhydride, hexahydrophthalic anhydride, and endomethylenetetrahydrophthalic anhydride.

A stabilizer may be present in minor proportion in the molten maleic anhydride to inhibit or prevent polymerization of the dienes. A preferred compound is 2,6-di-tertiary-butyl-p-cresol (Vanlube PC of R. T. Vanderbilt Company, Inc.). Other known phenolic inhibitors are also suitable, such as hydroquinone, tertiary-butyl catechol and hindered phenol rubber antioxidants, such as polyalkylated phenol [AgeRite Superlite of R. T. Vanderbilt Company, Inc.], 2,2'-methylenbis(4-ethyl-6-tertiary butyl phenol) [Antioxidant 425 of American Cyanamid], 4,4'-methylenebis(2,6-di-tertiary - butylphenol) [Antioxidant 702 of Ethyl Corporation], 4,4' - thiobis-(3-methyl-6-teritary-butylhpenol) [Santonox of Monsanto] and the like.

The reactants for providing the 4-methyl-Δ$^4$-tetrahydrophthalic anhydride-containing intermediate product, therefore, may be employed in the following ranges based upon the weight of the end product after rearrangement and deactivation of excess maleic anhydride: about 30 to 37%, preferably about 30 to 31% isoprene; about 1 to 9%, preferably about 5 to 6% butadiene; about 54 to 62%, preferably about 55 to 60%, maleic anhydride; about 0 to 10%, preferably about 5 to 10%, phthalic anhydride; and about 0 to 0.3%, preferably about 0.02% to 0.3%, stabilizer, such as, 2,6-di-tertiary-butyl-p-cresol.

An addition reaction, such as the Diels-Alder technique, is employed to provide the intermediate product. Any suitable conditions may be employed. However, it is preferred to carry out the reaction under a blanket of inert gas, and to use a temperature between about 55° and 140° C., preferably between about 70° and 120° C. The reaction time may vary over a wide range, such as about ¼ to 8 hours, preferably about 1 to 5 hours with the time being determined by the efficiency of heat removal. The reaction medium preferably should be acidic.

As a result of this reaction an intermediate product, which is a mixture of several compounds, is formed. The predominant compound therein is 4-methyl-$\Delta^4$-tetrahydrophthalic anhydride. However, small amounts of $\Delta^4$-tetrahydrophahalic anhydride corresponding to the amount of butadiene used are also present. Any excess maleic anhydride employed in the reaction is also present in the intermediate product as well as the phthalic anhydride and the stabilizer used to inhibit polymer formation. Accordingly, the intermediate product may have the following components in the ranges indicated: about 65 to 90%, preferably about 70 to 80%, 4-methyl-$\Delta^4$-tetrahydrophthalic anhydride; about 5 to 20%, preferably about 13 to 18%, $\Delta^4$-tetrahydrophthalic anhydride; about 0 to 10%, preferably about 5 to 10%, phthalic anhydride; about 0 to 5%, preferably about 0.1% to 3%, maleic anhydride; about 0.02 to 0.3% of stabilizer, such as 2,6-di-tertiary-butyl-p-cresol. If components other than butadience, maleic anhydride, isoprene and phthalic anhydride are used in the reaction, the composition of the intermediate product will vary accordingly.

The intermediate product comprising a major proportion of anhydrides having a carbon-carbon double bond in the $\Delta^4$-position is then subjected to a rearrangement of the position of the double bond. This rearrangement is effected in the present invention by treating the intermediate product with an organic sulfonic acid under critical conditions of time and temperature. The temperature preferably is from about 120° C. to 175° C. with the time varying from about 10 to 1 hour. If a higher temperature is used, undue coloration of the priduct occurs.

It is also critical to use at least about 0.05% of the organic sulfonic acid based upon the total end product. Generally the amount of sulfonic acid ranges from about 0.1% to 2% based upon the total end product. The organic sulfonic acid may be aliphatic or aromatic and the following acids, among others, are suitable: toluene sulfonic acid, xylene sulfonic acid, benzene sulfonic acid, dodecyl-benzene sulfonic acid, alkane sulfonic acids, such as methane sulfonic acid, and mixtures thereof.

Following the rearrangement step, an epoxide may be added in an amount sufficient to react with (or deactivate) the organic sulfonic acid rearrangement catalyst. A slight excess over the stoichiometric amount is generally used, such as about 0.25 to 1% based on the total end product. Any suitable epoxide compound can be used and these compounds contain the following structure:

These include ethylene oxide and propylene oxide among other epoxides. However, the same type of epoxy resin in which the curing agent of the invention is to be used is generally used for deactivation of the organic sulfonic acid rearrangement catalyst.

After rearrangement, only a minor proportion of the product is 4-methyl-$\Delta^4$-tetrahydrophthalic anhydride since there has been isomerization whereby the position of the double bond has been rearranged to the $\Delta^1$, $\Delta^2$, $\Delta^3$, $\Delta^5$ and $\Delta^6$ positions. The rearranged product may then be subjected to an optional step to remove or scavenge any substantial excess of maleic anhydride. Maleic anhydride usually can not be tolerated in an end product which is to be used as a curing agent for epoxy resins and, therefore, a removal or scavenging step is frequently necessary. The rearrangement reaction mixture is, therefore, contacted with one or more aliphatic conjugated dienes, such as isoprene, butadiene or any other defined heretofore. It is possible to use the same stream containing isoprene and butadiene which is used in the initial reaction to provide the intermediate product. The amount of aliphatic conjugated diene, e.g., butadiene or isoprene-butadiene mixture, added is that which is necessary to react with the maleic anhydride remaining in the rearranged product. The conditions for the scavenging reaction are in general the same as those heretofore described for preparing the intermediate product, but the temperature is at the lower end of the disclosed range. The scavenging step may or may not be carried out immediately after the rearrangement step. The scavenging reaction adds to the final product an amount of unisomerized $\Delta^4$-tetrahydrophthalic anhydride or derivatives corresponding to the amount of diene used to react with any excess maleic anhydride.

In accordance with the process of this invention, an end product is obtained after rearrangement and after substantial elimination of any excess maleic anhydride used, which is a new liquid combination of anhydride curing agents for use in curing epoxy resins. The anhydride composition of the resulting curing agent and the approximate range for the anhydrides are as follows:

| Anhydrides: | Range (percent) |
|---|---|
| 4-methyl-$\Delta^1$-tetrahydrophthalic anhydride | 0 to 10 |
| 4-methyl-$\Delta^2$-tetrahydrophthalic anhydride | 10 to 20 |
| 4-methyl-$\Delta^3$-tetrahydrophthalic anhydride | 30 to 60 |
| 4-methyl-$\Delta^4$-tetrahydrophthalic anhydride | 0 to 10 |
| 4-methyl-$\Delta^5$-tetrahydrophthalic anhydride | 0 to 10 |
| 4-methyl-$\Delta^6$-tetrahydrophthalic anhydride | 10 to 20 |
| $\Delta^4$-Tetrahydrophthalic anhydride | 0 to 20 |
| $\Delta^1$-Tetrahydrophthalic anhydride | 0 to 20 |
| $\Delta^2$-Tetrahydrophthalic anhydride | 0 to 20 |
| Phthalic anhydride | 1 to 10 |
| Maleic anhydride | 0.1 to 1 |

If compounds other than butadiene, maleic anhydride, isoprene and phthalic anhydride are used in the initial reaction and if compounds other than butadiene or a mixture of isoprene and butadiene are used in the scavenging step, the composition of the end product will vary accordingly.

As stated heretofore, the liquid isomerized anhydride curing agent of this invention can be employed in epoxy resins which are well known in the art [Polymer Processes, Schildkneckt, pages 429–474 (1956)]. For instance, it is known to react epichlorohydrin or the like with a diphenol, bisphenol, glycerol, certain fatty acids or the like, then dehydrohalogenate to form an epoxy resin polymer. A specific epoxy resin is the dehydrohalogenated reaction product of epichlorohydrin and Bisphenol-A( i.e., 2,2'-bis-(p-hydroxyphenyl)-propane, which is believed to have the following structure:

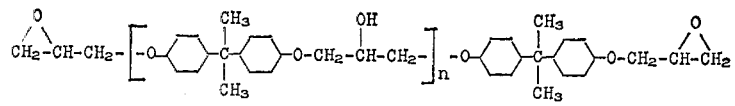

The epoxy resin can also be an aliphatic ether. Glycerin based epoxide resin, which is the epoxide resin formed from epichlorohydrin and glycerin (Epon 812 from Shell Chemical Company or Vanoxy 112 from R. T. Vanderbilt Company, Inc.), is an example of an aliphatic epoxide resin. Another example of aliphatic epoxide resin is glycidyl ester Epon 871 or Vanoxy 171 which cures to a flexible or rubbery resin. Other specific examples of epoxy resins are disclosed in U.S. Pat. No. 3,470,132 which is included herein by reference.

The anhydride curing agent of the invention is employed in the epoxy resin in about stoichiometric amounts, generally about 10 to 150 parts per 100 parts of resin (phr.), preferably about 30 to 100 phr. The anhydride curing agent may be incorporated in the epoxy resin by any acceptable procedure. The epoxy resin may also contain a minor amount of one or more of the catalytic agents normally used in curing epoxy resins. The catalytic agents normally used to cure epoxy resins include tertiary amines, such as benzyl dimethylamine and tris(dimethylaminomethyl)phenol; Lewis acids, such as boron trifluoride and its adducts; an Lewis bases, such as imidazole and alkyl-substituted imidazoles and their adducts.

The epoxy resin may also contain minor amounts of optional ingredients, such as reactive diluents, organic solvents, fillers and the like. By reactive diluents are meant those monoepoxides commonly introduced to change the properties of the cured resins derived from the diglycidyl ether of bisphenol-A. They include such monoepoxides as butyl glycidyl ether, phenyl glycidyl ether, cresyl glycidyl ether, allyl glycidyl ether and gamma-butyrolactone. Also included are such trade-named products as epoxide derived from a long chain aliphatic alcohol and known as "Epoxide 7" of Procter & Gamble, and the epoxy ester of mixed aliphatic $C_9$–$C_{11}$ monocarboxylic acids consisting principally of acids having a tertiary carbon alpha to the carboxyl and known as "Cardura E" of Shell Chemical Company.

Organic solvents which may be used in one embodiment include lower aromatic hydrocarbons such as benzene, toluene and xylene; lower aliphatic and cycloaliphatic ketones such as acetone, methyl ethyl ketone, diisobutyl ketone, cyclohexanone and methylcyclohexannone; and aliphatic esters of lower monocarboxylic acids such as ethyl acetate, isopropyl, acetate, butyl acetate and the like. These are non-reactive toward the glycidyl ether.

Fillers may also be used in conjunction with the epoxy resins. This includes the following among others: talc, silica, alumina and calcium carbonate.

The mixture of epoxy resin, anhydride crosslinking agent of the invention and any other ingredients may be cured by any acceptable procedure to form a finished epoxy product. One procedure is to cure at elevated temperatures. However, air drying at ambient temperatures may be suitable. The time for curing varies and it is dependent upon the temperature and other conditions, such as humidity. For instance, at a temperature of about 90° to 150° C. the time may be about 1 to 5 hours. These epoxy resins have numerous commercial uses. For instance, they may be applied in film to form to paper, glass and wooden substrates as protective coatings, adhesives and sealants.

Thus, in accordance with this invention, an improved process has been discovered for providing a mixture of isomerized tetrahydrophthalic anhydrides. Furthermore, an improved liquid isomerized anhydride curing agent has been formed and an improved epoxy resin product has been provided.

The following examples are submitted to illustrate but not to limit this invention. Unless otherwise indicated, all parts and percentages in the specification and claims are based upon weight.

EXAMPLE I

Maleic anhydride (3800 lb.), di-tertiary-butyl-4-cresol (7 lb.) and phthalic anhydride (450 lb.) were charged to a dried, steam-jacketed, nitrogen-filled reactor fitted with a stirrer. Steam was applied to melt the maleic anhydride and stirring was started after the temperature of the pot exceeded 60° C. Addition of 2237 lb. isoprene under pressure was started, and when the pot temperature reached 90°, the flow was adjusted to maintain the temperature between 90 and 100° with full cooling. Care was taken to keep the temperature above 60° to prevent solidification of the mass. Stirring was continued for 15 minutes at 90–100° after addition of isoprene was complete, and then 230 lb. butadiene was introduced at the same temperature and stirred for 15 minutes. Further increments of maleic anhydride and isoprene were then added as required in order to maintain a 2–3% excess of maleic anhydride to provide an intermediate product.

Subsequently, p-toluenesulfonic acid (14 lb.) was added to the intermediate product under nitrogen and the temperature raised to effect isomerization. The mass was stirred at 148–155° for four hours or until a clear point of 25° C. or lower was obtained to provide a rearranged (isomerized) product.

After cooling to 120° C., 45 lb. Vanoxy 126 of R. T. Vanderbilt Company, Inc., a moderately highly purified diglycidyl ether of bisphenol-A (WPE=185) was added to the rearranged product and stirred for 15 minutes at 115–125° to inactivate the isomerization catalyst. The reaction mixture was then cooled to 70° and 135° lb. additional butadiene was used to reduce excess maleic anhydride to 0.5–1.0% with agitation for 15 minutes at 70–80°. Then the nitrogen was bled off and the liquid isomerized anhydride end product could be used as a curing agent without further purification steps.

The yield was quantitative and the end product had a clear point of 25° C. and an APHA color of 488.

EXAMPLE II

The procedure of Example I was followed charging 3800 lb. maleic anhydride, 530 lb. phthalic anhydride, 7 lb. 2,6-di-tertiary-butyl-4-cresol, 2078 lb. isoprene and 230 lb. butadiene to the reactor under nitrogen. The resulting intermediate product was rearranged with p-toluenesulfonic acid (14 lb.) as the isomerization catalyst which was subsequently inactivated by 45 lb. Vanoxy 126. Additional butadiene (298 lb.) was then used to reduce the excess maleic anhydride.

The end product had a clear point of 21° C. and an APHA color of 392. The yield was quantitative.

EXAMPLE III

The procedure of Example I was again followed using 3950 lb. maleic anhydride, 530 lb. phthalic anhydride, 7.5 lb. of 2,6-di-tertiary-butyl-4-cresol, 2170 lb. isoprene and 370 lb. butadiene. The isomerization catalyst, however, was xylenesulfonic acid (14 lb.). Vanoxy 126 (37 lb.) was employed to inactivate the catalyst and 78 lb. of additional butadiene was used to react with the excess maleic anhydride.

The yield was quantitative and the resulting product, which can be used as a curing agent, had a clear point of 24° C. and an APHA color of 404.

EXAMPLE IV

The curing agent prepared in Example I (85 grams) was blended with a 100-gram portion of epoxy resin (Vanoxy 126) and 1 gram of an imidazole adduct accelerator (Super Van Go of R. T. Vanderbilt Company, Inc.) was added. The reaction mixture thus formed was poured into heat distortion bar molds in duplicate, and cured in a hot air oven at 85° C. for two hours, then at 150° C. for three hours. After cooling to room temperature, the bars were removed from the molds and subjected to the heat distortion temperature test of ASTM method D648–56. The heat distortion temperature was 141° C.

EXAMPLE V

The curing agent of Example III was tested at three different levels, as indicated in Table 1, in the epoxy resin of Example IV. Heat distortion bars were molded, cured and tested as described in Example IV. The results are also indicated in Table 1.

TABLE 1

| Composition | A | B | C |
|---|---|---|---|
| Epoxy resin (g.) | 100 | 100 | 100 |
| Curing agent (g.) | 80 | 85 | 90 |
| Accelerator of Example IV (g.) | 1 | 1 | 1 |
| Heat distortion temperature (° C.) | 139 | 140 | 136 |

Examples IV and V demonstrate that the liquid isomerized anhydride product of the invention is a suitable curing agent for an epoxy resin.

EXAMPLE VI

The following additional types of epoxy resins were cured with the liquid isomerized anhydride curing agent of Example III: novolac type of phenolic resin epoxidized with epichlorohydrin (DEN 438 of Dow Chemical Company), an epoxide resin derived from dimerized fatty acid and containing terminal glycidyl ester groups (Epon 871 of Shell Chemical Company), and an aliphatic epoxide resin derived from glycerin (Epon 812 of Shell Chemical Company). To separate 100-gram portions of each of these resins was added, at room temperature, the stoichiomertic amount as listed in Table 2 of the liquid isomerized anhydride curing agent of Example IV and 1 gram of accelerator of Example IV. Heat distortion bars were molded, cured and tested according to the method of Example IV. Hardness of each cured resin was determined according to ASTM method D314–58 (Shore Hardness). The results are listed also in Table 2.

TABLE 2

| Composition | A | B | C |
|---|---|---|---|
| Epoxidized novolac resin (g.) | 100 | | |
| Aliphatic glycidyl ester of dimer acid (g.) | | 100 | |
| Aliphatic glycidyl ether of glycerin resin | | | 100 |
| Liquid isomerized anhydride curing agent (g.) | 90 | 37 | 105 |
| Accelerator of Example IV (g.) | 1 | 1 | 1 |
| Heat distortion point (° C.) | 156 | <25 | 72 |
| Shore D Hardness | >85 | 20 | >85 |

These examples show that the product of the invention is useful as a curing agent for various types of epoxy resins.

Having set forth the general nature and specific embodiments of the present invention, the true scope is now particularly pointed out in the appended claims.

What is claimed is:

1. A process for preparing a liquid isomerized anhydride mixture as a curing agent which comprises reacting a mixture of conjugated dienes with maleic anhydride to form an intermediate product containing a mixture of anhydrides comprising 4-methyl-$\Delta^4$-tetrahydrophthalic anhydride; isomerizing the intermediate product in the presence of an alkyl or aromatic sulfonic acid catalyst at a temperature from about 120° C. to 175° C. with the time varying from about 10 to 1 hours whereby double bonds in the anhydride intermediate product are rearranged; and deactivating the catalyst present in the rearranged product by reaction with an added epoxide.

2. The process according to claim 1 in which the diene mixture is isoprene and butadiene.

3. The process according to claim 1 in which phthalic anhydride is included in the reaction mixture for forming the intermediate product.

4. The process according to claim 1 in which the organic sulfonic catalyst is toluene sulfonic acid.

5. The process according to claim 1 in which the organic sulfonic catalyst is xylene sulfonic acid.

6. A process for preparing a liquid isomerized anhydride mixture as a curing agent which comprises reacting a mixture of conjugated dienes with an excess of maleic anhydride to form an intermediate product containing a mixture of anhydrides comprising 4-methyl-$\Delta^4$-tetrahydrophthalic anhydride; isomerizing the intermediate product in the presence of an alkyl or aromatic sulfonic acid catalyst at a temperature from about 120° C. to 175° C. with the time varying from about 10 to 1 hours whereby double bonds in the anhydride intermediate product are rearranged; and removing the excess maleic anhydride by reaction with an added conjugated diene.

7. The process according to claim 6 in which said added diene is a mixture of isoprene and butadiene.

8. A process for preparing a liquid isomerized anhydride as a curing agent which comprises reacting a mixture of conjugated dienes with maleic anhydride to form an intermediate product containing a mixture of anhydrides comprising 4-methyl-$\Delta^4$-tetrahydrophthalic anhydride; isomerizing the intermediate product in the presence of an alkyl or aromatic sulfonic acid catalyst at a temperature from about 120° C. to 175° C. with the time varying from about 10 to 1 hours whereby double bonds in the anhydride intermediate product are rearranged; deactivating the catalyst present in the rearranged product by reaction with an added epoxide; and removing the excess maleic anhydride by reaction with an added conjugated diene.

References Cited

UNITED STATES PATENTS

| 3,470,132 | 9/1969 | Ernst et al. | 260—47 EA |
| 2,959,599 | 11/1960 | Bailey | 260—346.6 |
| 3,470,214 | 9/1969 | Young | 260—346.3 |
| 2,275,383 | 3/1942 | Soday | 260—346.6 |

OTHER REFERENCES

The Condensed Chemical Dictionary, 6th Edition, Reinhold, 1961, p. 1150.

Fuson, Advanced Organic Chemistry, John Wiley & Son, 1950, p. 578.

RICHARD D. LOVERING, Primary Examiner

I. GLUCK, Assistant Examiner

U.S. Cl. X.R.

252—407; 260—2 EA, 18 EP, 47 EA, 346.6